March 22, 1960 R. C. WEBB 2,930,033
ANGULAR POSITION CONVERTER
Filed April 17, 1956 3 Sheets-Sheet 1

INVENTOR.
Richard C. Webb
BY
W. E. Thibodeau, A. W. Few & M. W. Bachrach
ATTORNEYS March 22, 1960 R. C. WEBB 2,930,033
ANGULAR POSITION CONVERTER
Filed April 17, 1956 3 Sheets-Sheet 2
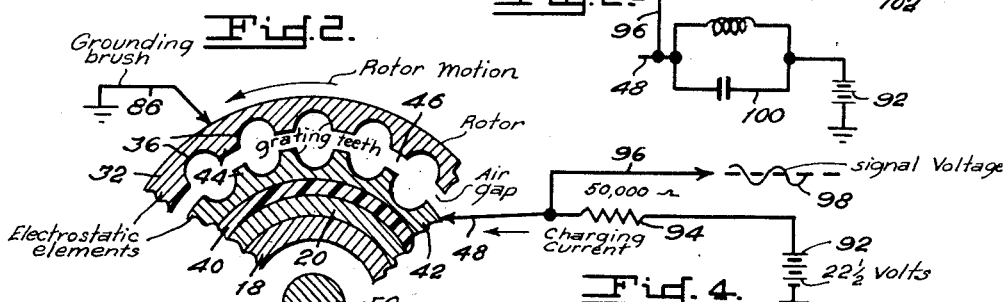
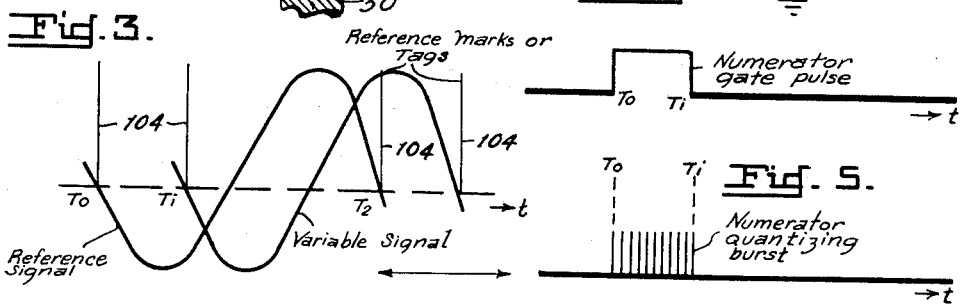
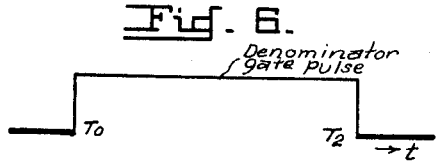
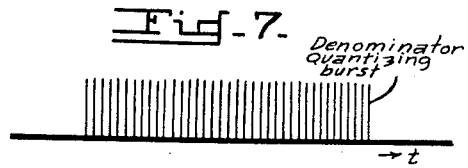
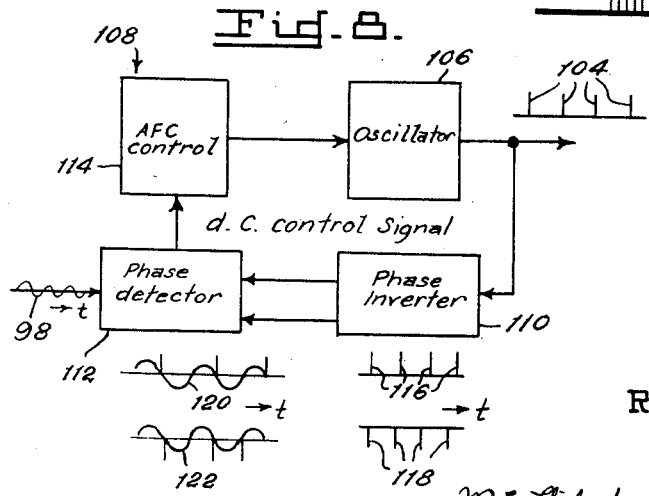
INVENTOR.
Richard C. Webb
BY
M. E. Thibodeau, A. W. Dew & M. W. Bachrach
ATTORNEYS.

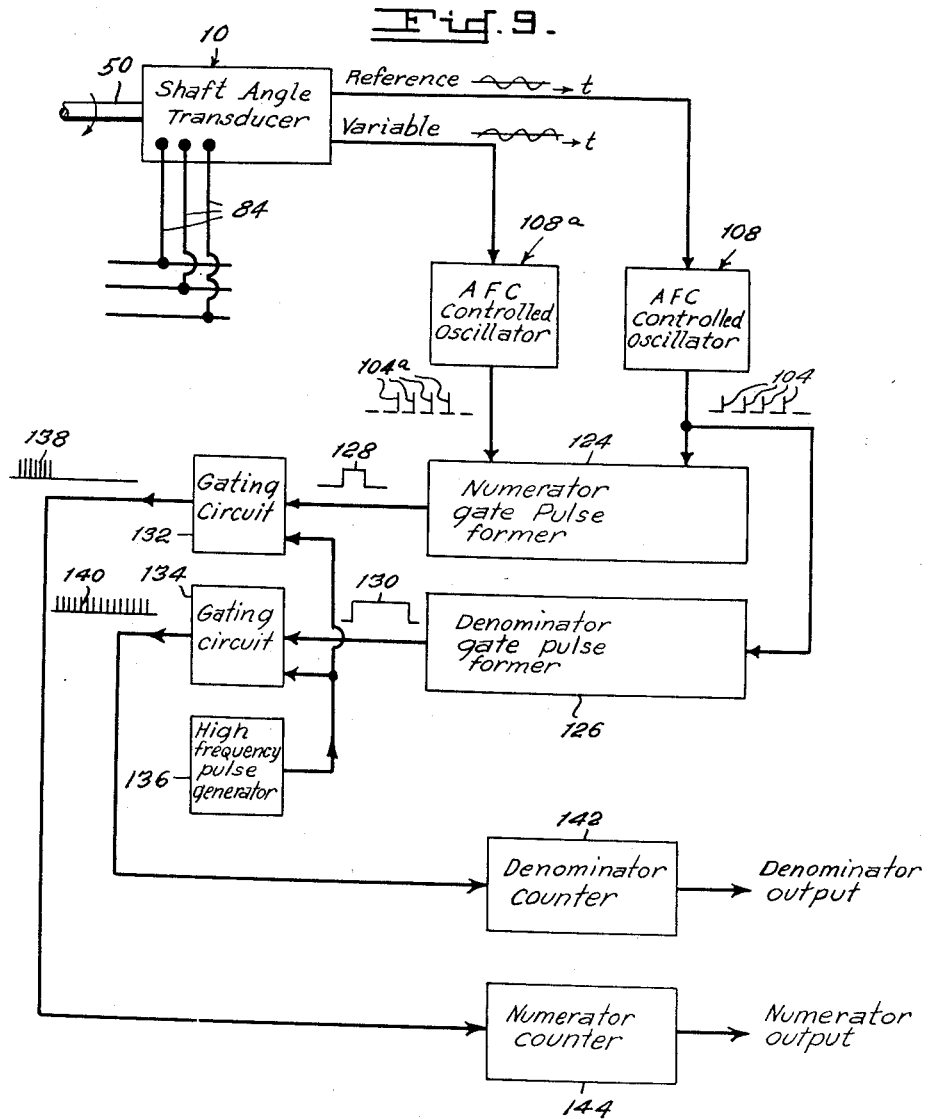

United States Patent Office 2,930,033
Patented Mar. 22, 1960

2,930,033
ANGULAR POSITION CONVERTER

Richard C. Webb, Denver, Colo., assignor to the United States of America as represented by the Secretary of the Army Application April 17, 1956, Serial No. 578,853

7 Claims. (Cl. 340—347)

This invention is directed to digital converters and particularly to the type wherein analog shaft position is to be converted into digital values.

Furthermore, the present invention is particularly directed to an electro-mechanical type of digital converter, wherein an electromechanical sensing head or transducer element is used in cooperation with certain special electronic circuits which are particularly adapted to perform the process of digital encoding of the electrical signals generated within the transducer element.

Digital converters of the type heretofore used in the art are usually capable of resolving analog position settings to an accuracy measured in minutes of arc. It is the purpose of the present invention to provide a converter capable of resolving angular settings measured to an accuracy of only a few seconds of arc.

The complete digital converter includes both the electronic apparatus involved in producing digital encoding of shaft positions as well as the position-sensing transducer element. We shall begin by describing the transducer element and conclude with a description of the electronic apparatus that is associated with it for the purpose of achieving the digital information.

The purpose of the transducer element is to produce two substantially sinusoidal electrical signals, both signals having the same frequency, amplitude, and wave form. One of these signals is designated as the reference signal. The other is designated as the variable phase signal, the phase of this signal being adapted to vary with respect to the reference signal when the transducer shaft is displaced from the "zero" position. The phase of the variable phase signal moves through 360 electrical degrees with respect to the reference signal for each unit of mechanical rotation of the shaft. For example, in some applications it may be desired to fix the unit shaft displacement at one mechanical degree, in which case the phase of the variable signal will shift through 360 electrical degrees for each degree of rotation of the shaft.

With the use of certain precise electronic circuitry, to be described hereinafter, in cooperation with the transducer, the electrical phase shift between the reference and variable phase signals may be rapidly measured and recorded or transmitted in digital form.

The coarse shaft position reading in degrees or reference units of arc will usually be achieved with the aid of electrical signals obtained from an ordinary inductive resolver which is associated with the transducer shaft. Inasmuch as inductive resolvers are well known in the prior art their operation will be familiar to those skilled in the art, and since they form no part of this invention no attempt is made to explain them further here. This disclosure concerns itself principally with the acquisition of the precise or vernier reading within the reference unit.

An essential feature of the transducer element disclosed herein is the generation of electrical signals within the transducer directly from the mechanical motion of one or more essential components in the transducer head. This is by way of contrast with digital converters of the type wherein the elements are substantially stationary and A.-C. currents are applied to the converter or, in the case of the electro-static type converter wherein A.-C. voltages are applied to stationary capacitive elements within the converter. A third form of digital converter, which is to be excluded from the type disclosed herein, is the Gray Code-Wheel system wherein conducting radial bars are inscribed upon a metal plate in concentric rings, the coding on each ring bearing a relation to the binary encoding of the positional setting of the shaft, the latter being in contact with the output circuits via a multiplicity of brushes. This device is again a static type transducer wherein the only motion present is that of the shaft to be measured. The shaft position transducer disclosed herein is characterized by the continuous motion of one or more internal elements.

A second essential feature is that the transducer contains a system of uniform gratings which may take the form of a multiplicity of mechanical slits or bars, optical slits, or magnetized marks, one set of said grating elements constituting the stationary portion of the reference signal generator, the second set being an identical system of grating slits, bars or magnetized elements which are mounted upon a steadily rotating part, or rotor of the transducer in such a way that the moving set of elements passes the stationary set with a very small mechanical clearance; thus, in the case of an optical slit system, pulses of light would be permitted to pass intermittently through all of the slits simultaneously thereby energizing a photoelectric cell from which resulting electrical impulses may be obtained. In the case of an electrostatic system, all of the conducting bars around the entire periphery of the rotor and stator act to form a capacitor whose value varies in accordance with the instantaneous rotor position, thus inducing a cyclic charging current to flow through a load impedance from a D.-C. source to provide the electrical output signal. In the case of a magnetic system, magnetized bars on the rotor, passing a similar set of pole pieces on the stator, the latter being interwound with a conducting winding, give rise to an alternating voltage which constitutes the electrical output signal.

A third essential feature of the device is that the variable phase generating portion of the transducer consists again of a system comprising a multiplicity of light slits, bars or magnetized elements arranged in a uniform grating fashion, one set of which moves with the shaft, the angular position of which is to be measured, the other set being provided upon the rotor. The variable phase signal is generated by a mechanism identical to one of the above methods.

Thus it is seen that the fixed and variable phase signals which comprise the output of the fine vernier portion of the shaft angle transducer may be produced by various means involving relative motion between sets of grating elements which may serve either to chop light rays, vary the charging current in an electro-static system of conducting bars, or change the reluctance of the magnetic path between sets of toothed magnetic wheels. In any case, the resulting signals produced by one of these means constitute satisfactory electrical signals of fixed and variable phase types to be used with the digital encoding circuitry disclosed herein.

One object of this invention, therefore, is to provide a highly reliable device adapted to measure shaft angle position to an accuracy of a few seconds of arc.

Another object is a novel transducer element adapted to cooperate with electronic circuits to measure shaft angle position to extreme accuracy.

A still further object is the use of refeernce and variable phase signals to determine shaft angle position.

An additional object is a novel encoding system adapted to accurately digitize shaft angle position.

Other objects and advantages will become apparent from a study of the following disclosure including the drawings wherein:

Fig. 2 is a fragmentary view in cross section of the device of Fig. 1, taken on line 2—2 thereof, showing the signal generating means.

Fig. 2a is an electrical input circuit for alternative use with the system of Fig. 2.

Fig. 3 shows the relationship of the reference signal and the variable phase signal when the transducer shaft is displaced from the "zero" position, and the spikes or "tags" which occur at points where the signal curves cross the time axis.

Fig. 4 shows the numerator gate pulse which exists during the interval representing the phase difference between the reference signal and the variable phase signal.

Fig. 5 shows the high frequency burst of spikes which occurs during the period of the numerator gate pulse shown in Fig. 4.

Fig. 6 shows the denominator gate pulse which exists during the interval representing one complete cycle of the reference signal.

Fig. 7 shows the high frequency burst of spikes which occurs during the period of the denominator gate pulse shown in Fig. 6.

Fig. 8 is a block diagram of an automatic frequency controlled oscillator circuit which is adapted to produce the "tags" shown in Fig. 3 and to control the precise occurrence of those tabs.

Fig. 9 is a block diagram of the entire shaft angle position converter system.

Figure 1:
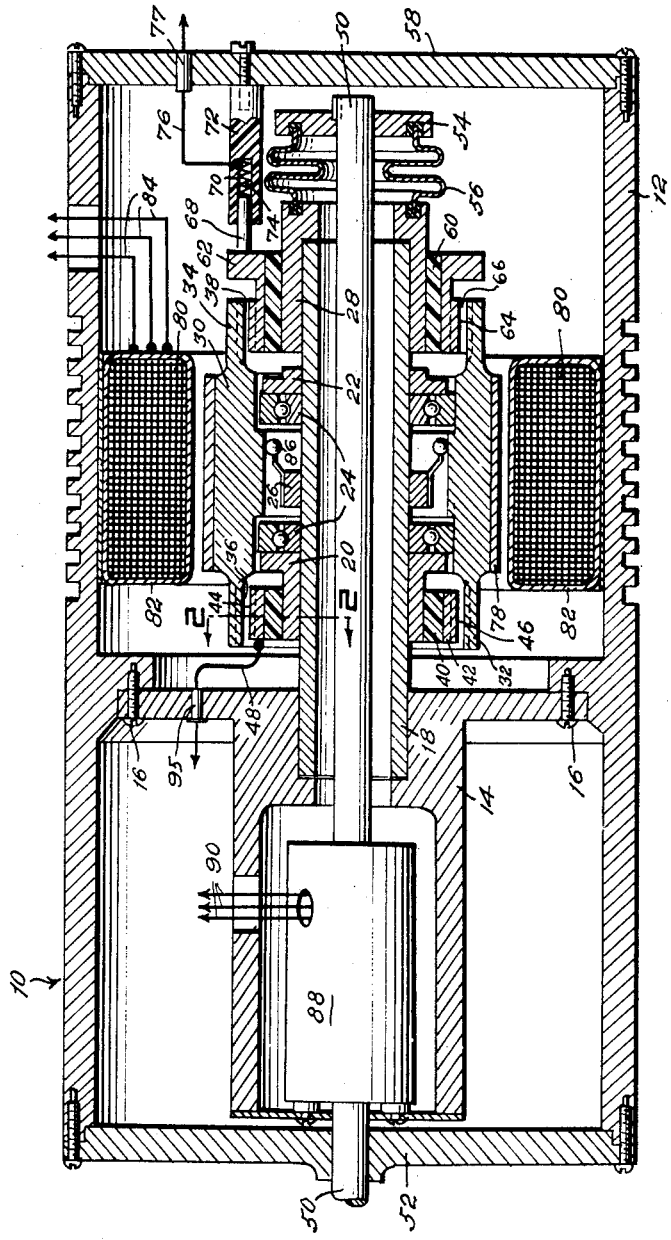
Fig. 1 is an axial sectional view of the transducer element of this invention.

Referring to Fig. 1, the transducer, indicated generally by reference 10, is shown in its preferred form, as an electrostatic signal generator. It comprises a cylindrical outer shell 12 having affixed thereto a centering mount 14 by means of screws 16. Mount 14 supports tube 18. This tube carries thereabout for the purpose of support, components including bearing retainer bushings 20 and 22, a pair of roller bearings 24, brush support ring 26, and precision bearing 28, all of which elements intimately embrace the tube. The outer races of bearings 24 serve to support a generally tubular rotor 30, the rotor being provided with oppositely disposed integral extensions 32 and 34 of less thickness than the portion of the rotor which rides upon said bearings. The extensions are provided with identical sets of cavities forming sets of grating teeth 36 and 38 provided upon the internal circumference of said extensions, the grating teeth running axially of the rotor equidistant from one another.

An annular insulator 40, circumferentially embracing bearing retainer 20 is provided for the purpose of electrically isolating grating ring 42 from the bearing retainer 20 and the transducer parts in electrically conductive relationship therewith. A set of grating teeth 44, which are complementary to and adapted to cooperate with grating teeth 36, are provided upon the outer circumference of grating ring 42. A small air gap 46 must be maintained between these two sets of teeth as is shown more clearly in Fig. 2. Lead 48 connects grating ring 42 with the input circuit of Fig. 2 as is explained in detail hereinafter.

Transducer shaft 50, which is disposed axially of the transducer, has one end thereof journaled in end plate 52 of shell 12, the other end thereof carrying disc 54, which is keyed to said shaft. Bellows 56 connects disc 54 with precision bearing 28 so that the torque of the shaft, as it is turned, is transmitted to the bearing. The weight of the end of shaft 50 adjacent end plate 58 is carried by tube 18.

Annular insulator 60, circumferentially embracing precision bearing 28, is provided for the purpose of electrically isolating grating ring 62 from the precision bearing 28 and the transducer parts in electrically conductive relationship therewith. A set of grating teeth 64, which are complementary to and adapted to cooperate with grating teeth 38, are provided upon the outer circumference of grating ring 62. A small air gap 66 must be maintained between the two sets of grating teeth. Brush 68, accommodated within bore 70 of brush housing 72, is biased against grating ring 62 by spring 74, the housing being affixed to end plate 58. Lead 76 connects brush 68 with the input circuit of Fig. 2 as is explained hereinafter. Lead 76 is carried through shell 12 by insulator 77.

Rotor 30 is provided thereabout with a hysteresis motor sleeve 78 which is adapted to cooperate electromagnetically with polyphase field coils 80 of pole pieces 82 for the purpose of imparting motion to rotor 30. The coils are excited by an alternating power source, not shown, brought into the transducer by power cables 84. The rotor is grounded to tube 18 by brushes 86 through brush support ring 26.

A coarse degree resolver 88, affixed to mount 14, is associated with shaft 50 in a manner, not shown. The coarse degree information is conducted from the resolver by leads 90.

The electrical input circuit associated with transducer 10 is shown in Fig. 2. Extension 32 connects with ground through brush 86, shown here simply as a conductor. The source of the charging current, which may be a battery 92 of 22½ volt potential is brought into electrical engagement with grating ring 42 by lead 48 through load resistor 94 which, in this embodiment, is shown to be 50,000 ohms. As shown in Fig. 1, an insulator 95 prevents lead 48 from being grounded to mount 14. Lead 96, Fig. 2, carries the transducer output signal voltages 98 to the external circuit from grating ring 42 as is described hereinafter.

Fig. 2a shows a tank circuit 100 which may be substituted for the resistor 94 of the circuit of Fig. 2. The output signal 102 is substantially the same as output signal 98 of Fig. 2.

Although the circuit of Fig. 2, previously described, is the reference signal generating circuit, it should be understood that the variable phase signal generating circuit is identical thereto.

In order to obtain a digital reading representing the angular position of shaft 50 to a high degree of accuracy, the method employed is to generate two identical signals, the phase difference between them representing the angular displacement of the shaft, and to digitize the phase difference by electronic means.

Transducer 10 is employed to generate the signals. The rotor 30 is adapted to spin at a constant rate about tube 18 upon bearings 24, the motion being imparted to the rotor by the hysteresis motor sleeve 78 and the effect of polyphase currents flowing in field coils 80.

The means for generating the reference signal by the electrostatic method can best be understood from an examination of Fig. 2, which shows a section through the reference signal electrostatic generator. The variable phase signal generator is identical to the reference signal generator with the exception that the set of grating teeth 64 of the variable phase generator is provided upon a movable element, i.e., grating ring 62, whereas grating teeth 44 of the reference signal generator are provided upon a stationary element, i.e., grating ring 42 (Fig. 1). Extension 32 of rotor 30 is shown to be executing a counter-clockwise rotation (Fig. 2) with respect to stationary grating ring 42. As grating teeth 36 pass grating teeth 44 across the air gap 46, the electrical capacitance between rotor 30 and grating ring 42 varies through a cycle of maximum to minimum value as one tooth passes the other. As the capacitance changes with motion of the rotor, a charging current is induced to flow from a source of D.-C. voltage, such as the 22½ volt battery 92, through the load resistor 94. The reference voltage, or the variable phase voltage as the case may be, is established across said resistor, the voltage being of substantially sinusoidal waveform, the exact waveform being determined by the shape and mechanical arrangement of the grating teeth, the size of resistor 94, and the incidental capacitance present in the circuitry which connects the transducer with the external equipment.

Alternatively, a tuned tank circuit 100 might be advantageously substituted for the charging resistor 94. In fact, this is a preferred arrangement since it has been found that the overall accuracy of the system is improved with the generation of more nearly sinusoidal signals by the transducer. A resonant circuit, tuned exactly to the frequency of the generator, is extremely effective in maintaining a sinusoidal waveform.

The grating teeth 36 of extension 32 of rotor 30 are aligned with grating teeth 38 of extension 34 of the rotor. When shaft 50 is in the zero (no displacement) position, grating teeth 44 of stationary grating ring 42 are aligned with grating teeth 64 of movable grating ring 62. In this position, with the rotor 30 spinning at a constant rate, the variable phase signal will coincide with the reference signal. Now, if shaft 50 is displaced somewhat in either direction, grating teeth 64 are misaligned with grating teeth 44. In this position of the shaft the variable phase signal is out of phase with the reference signal as shown in Fig. 3. It can be seen from an examination of Fig. 1 that any motion of shaft 50 is transmitted to grating ring 62 through plate 54, bellows 56, precision bearing 28 and annular insulator 60. Each time the shaft is rotated through one pitch of the grating teeth, the phase of the variable phase signal shifts 360 electrical degrees with respect to the reference signal.

One feature of this type of shaft angle transducer is that the multiplicity of grating teeth symmetrically disposed provides averaging of errors that may exist in the layout of the teeth, at least insofar as these errors are of a random nature.

Various techniques for measuring the phase angle between two sinusoidal waveforms are common in the art. Many of these techniques are suitable for use only in the case where static or semi-static conditions prevail wherein abundant time is available for manual balancing of electrical bridges, etc. In general each such measurement of the angular phase setting might be done manually or with the aid of automatic controls, but at least several seconds would likely be required to make each measurement.

For the application envisioned for this digitizer system, it is contemplated that it will be necessary to be able to make a considerable number of measurements of the vernier setting each second, as for example, ten to one hundred samplings of the vernier may be required per second. Furthermore, in many applications where the angular position of a shaft must be metered several times each second, the shaft may actually be in motion and therefore each reading of the digitizer must be accomplished in as short an interval of time as possible, so that the slue motion of the shaft will not be sufficient to blur or change the sample reading appreciably during the reading interval.

With these objectives in mind, it is clear that the well-established techniques on the earlier art will find little application here.

As an example of the operating speeds involved, take the case of an experimental model of the digitizer, which was designed to sample the shaft position of a theodolite whose slue rate might be as great as 10 degrees per second. Readings were to be obtained to an accuracy of 6 seconds of arc. In this case the requirements of reading accuracy and shaft slue rate dictated a rotor speed for the transducer unit of 1,000 r.p.m. which, used with rotor and stator elements of 360 teeth each, produced a basic waveform of 6,000 cycles per second. With these operating speeds a complete phase measurment may be completed in no more than $\frac{1}{6,000}$ second, thus accomplishing the reading within a time interval during which the shaft would not have turned by more than six seconds of arc.

The performance of a precision phase measurement within an interval not exceeding the period of the basic signal frequency generated by the transducer is achieved in the following manner: Referring to Fig. 3, the basic reference and variable phase sine wave signals are seen to have been "tagged" with narrow pulses or spikes 104 precisely at their zero crossings. The method of introducing these "tags" will be described shortly as the use of these marks identifying a particularly point on the waveforms of the two basic signals is of fundamental importance in this method of digitizing the phase measurements.

Fig. 4 shows how the "tags" are used in the subsequent electronic circuits to create a numerator gate pulse, the leading edge of which is triggered by the "tag" associated with the reference signal occurring in time position $T_0$. The trailing edge of the numerator gate pulse is triggered at $T_1$ by the reference "tag" associated with the variable phase signal. Thus, a gate pulse of duration $T_1-T_0$ is created in accordance with the phase position of the basic signals from the transducer and it is evident that the length of this gate pulse is analogous to the relative phase position of the two transducer signals.

Fig. 5 shows how the numerator gate pulse length is time quantized for the digitization of the phase measurement. Here a steady burst of high frequency pulses (say 3 mc./s.) is shown as it might be chopped or modulated by the operation of the gate pulse of Fig. 4 within an electronic circuit. The exact number of pulses to be used in the quantizing burst would, of course, be determined by the designer in accordance with his particular requirements for precision in the measurement of the phase displacement.

Fig. 6 shows a second gate pulse, referred to as the denominator gate pulse. It is the purpose of this latter pulse to represent the full period of the basic waveform from the transducer, namely the period from $T_0$ to $T_2$, which is the time between any pair of "tags" associated with the reference signal.

The denominator gate pulse of Fig. 6 is time quantized as above with the use of identical pulses from the source used to quantize the numerator gate pulse. Thus, the objective vernier value for a particular setting of the shaft may be defined in digital form by expressing the ratio of the number of pulses in the numerator quantizing burst of Fig. 5, to those in the denominator quantizing burst of Fig. 7.

All of the electronic circuitry involved in achieving the gating operations described above makes use of techniques well known in the art. Of particular interest, however, is the method by which the reference "tags" shown in Fig. 3 are attached precisely at the zero crossings of the sine waves coming from the transducer unit. These "tags" are of fundamental importance to the digitization scheme disclosed herein and any loss of precision in positioning these "tags" directly over the zero crossings of the basic signals would obviously deteriorate the overall precision of the digitizer. Therefore, it is necessary to find a method of positioning the reference marks with the utmost precision. Methods practiced earlier in the art have involved such operations as amplifying the reference and variable phase signals greatly and squaring the sinusoidal waveform with the use of amplitude limiters or clippers to obtain steep edges near the original zero crossings. This latter technique, while generally satisfactory for the production of square waveforms from sinusoidal input signals, suffers in loss of accuracy of the position of the edges of the square waves to such an extent that this technique was found inapplicable for an instrument of the precision envisioned here.

Fig. 8 shows a block diagram of a novel technique which is employed to establish precision reference marks at the zero crossings of the sinusoidal signals from the transducer unit. An automatically frequency controlled oscillator circuit 108 is arranged to supply very narrow pulses to its output circuit as indicated by the wave-form 104. The oscillator 106 thereof might well be one of the type known as a blocking oscillator, which is characterized by the development of very narrow voltage spikes, such as a blocking oscillator disclosed in Department of Air Force Manual 52–8 entitled "Radar Circuit Analysis," dated June 30, 1951, on pages 7–27 to 7–29. Other types of oscillators, however, may be just as well suited to this application, as for example, a high inertia L-C tuned oscillator in which the component vacuum tube or transistor equivalent would be operated in the so-called Class "C" fashion, wherein the anode current of the oscillator tube would flow for only a very small fraction of the total period of oscillation and thus produce narrow current spikes which might very well be sharpened sufficiently to serve as the output waveform 104. One feature of such an oscillator that would make it particularly suited to this application would be an inherently high natural frequency stability. A further requirement of the oscillator circuit is that it be capable of frequency control by means of a voltage sensitive control circuit, after the fashion known earlier in the art of "automatic frequency control" as disclosed on page 296 of the Radiation Laboratory Series volume 16, entitled "Microwave Mixers," dated 1948.

Output pulses from the oscillator 106 of automatic frequency controlled oscillator circuit 108 are taken to a phase inverter 110 such as disclosed on pages 7–27 to 7–29 of Department of Air Force Manual 52–9 entitled "Radar Circuit Analysis" dated June 30, 1951, where a duplicate set of positive going pulses 116 and negative going pulses 118 are formed, both sets of which are applied to the phase detector 112 similar to a detector shown on pages 383–386 of Radiation Laboratory Series, volume 21, entitled "Electronic Instruments," dated 1948, where they are mixed with one or the other of the incoming sinusoidal signals 98 or 102 from the shaft angle transducer.

Within the phase detector, waveforms 120 and 122 are developed by the summation of the input waveforms. The phase detector functions as a peak detector so that whenever the phase of oscillator signal 104 should attempt to change from the desired position opposite the zero crossing of the incoming sinusoidal signal 98, as for example it might tend to lag the proper position, one set of the oscillator "tag" pulses would be elevated in their position on the sinusoidal waveform 120, thus becoming more positive, while at the same time the tag pulses of waveform 122 would be depressed and become less negative. The result of this shift applied to the otherwise balanced back to back peak detector circuit is to produce a net positive D.-C. control signal at the input to automatic frequency control device 114, the signal acting upon the null seeking automatic frequency control in such a manner as to raise the frequency of the oscillator sufficiently to move the oscillator pulses forward along the wavefrom 120 to properly coincide with the zero crossings thereof.

In the event the oscillator should increase its frequency and the pulses should crawl forward along the waveforms 120 and 122, the reverse of the above situation would prevail, the AFC control would reduce the frequency of the oscillator to produce a null balance in the detector, thus again reestablishing the position of the "tag" pulses precisely over the zero crossings.

It is clear from the above description of the AFC control circuit 108, that it constitutes a form of servo-control of an otherwise free running oscillator 106, said oscillator being one of inherent natural stability, the mean frequency of which is thus readily brought into coincidence with that of the sinusoidal signal from one of the transducer elements. It is furthermore evident that the accuracy with which the automatic frequency control circuit may be able to position the "tag" pulses over the zero crossings of the incoming signal waves depends largely upon the amount of amplification that is applied to the control signal within the servo-loop. Thus, substantially any required amount of accuracy in the placement of the pulses can be achieved provided the designer is willing to include sufficient amplification in the servo-loop and take sufficient care to design a stable system.

By reference to Fig. 9 an overall picture of the invention may be obtained. When the transducer 10 is in operation, two signals, a reference signal and a variable phase signal appear at the output thereof, the phase difference between the two signals depending upon the angular position of shaft 50, the shaft being moveable by an independent means, not shown. The reference signal is fed into block 108 which represents the automatic frequency controlled oscillator circuit of Fig. 8 previously described. At the same time the variable phase signal is applied to block 108a, which is identical to the circuit of block 108. The outputs of circuit 108 and 108a are indicated by references 104 and 104a, respectively, the waveforms being identical. Both outputs are impressed upon numerator gate pulse former 124, output 104 being fed additionally into denominator gate pulse former 126. The pulse formers 124 and 126 could be of the Essles Jordan type as disclosed on page 65 of the Department of Army Technical Manual 11–672, entitled "Pulse Techniques," dated October 1951. The output of the gate pulse forming circuits is indicated by waveform 128 which represents the numerator gate pulse length, and 130 which represents the denominator gate pulse length. These pulses are applied to gating circuits 132 and 134 where the opening of these gates by waveforms 128 and 130 permits bursts of high frequency pulses from generator 136 to pass through the duration of the gating pulses thus producing pulse bursts 138 and 140 which are quantized versions of the gate pulse lengths and in general fully represent the numerator and denominator values of the vernier setting of input shaft 50.

Pulse bursts 138 and 140 are finally taken to the numerator and denominator counters or scaler units 144 and 142, respectively, where the digital values are acquired in accordance with some number system such as, for example, the binary system, the decimal binary system or any other system best suited to the application. The counters 142 and 144 also serve as short term storage for the data prior to its transfer into a recording medium such as magnetic tape, punch cards, punch tape, etc., in accordance with techniques now common in digital computers. The final digitized outputs from counters 142 and 144 are thus of a form readily suited to use with devices now common in the digital computer field, not shown, which will indicate in a digitized form the ratio of the numerator gate pulse to the denominator gate pulse. This ratio is the displacement from zero position of shaft 50.

While I have shown the form of the invention now preferred by me, numerous modifications and substitutions of equivalents will occur to those skilled in the art after a study of the foregoing disclosure. Hence, the disclosure is to be taken in an illustrative rather than a limiting sense and all modifications falling within the scope of the subjoined claims are reserved.

I claim:
1. A shaft angular position converter adapted to convert analog shaft position into digital values comprising an electromechanical transducer having means for generating a pair of alternating voltages, the phase difference of which is adapted to vary, said means comprising a pair of alternating voltage generating elements, a first automatic frequency controlled oscillator circuit and a second automatic frequency controlled oscillator circuit; the first of said alternating voltages being applied to the first oscillator circuit and the second of said alternating voltages being applied to the second oscillator circuit, a numerator gate pulse former into which the outputs of both oscillator circuits are fed, a denominator gate pulse former into which the output from the first oscillator circuit only is fed, a first gating circuit and a second gating circuit, the output from the numerator gate pulse former being applied to the first gating circuit and the output from the denominator gate pulse former being applied to the second gating circuit, a high frequency pulse generator the output of which is fed into the first and second gating circuits, a numerator counter and a denominator counter, the output of the first gating circuit being fed into the numerator counter and the output of the second gating circuit being fed into the denominator counter.

2. The invention in accordance with claim 1 wherein each automatic frequency controlled oscillator circuit comprises an oscillator and a phase inverter, the oscillator output being fed into the phase inverter, a phase detector into which the positive voltage and the negative voltage from the phase inverter are fed, the voltage from the transducer being applied to said phase detector additionally, and an automatic frequency control device into which the output from the phase inverter is fed, the output from the automatic frequency control device being fed into the oscillator.

3. A shaft angular position converter adapted to convert shaft position into digital values comprising an electromechanical transducer having means for generating a pair of alternating voltages the phase difference of which is adapted to vary, said means comprising a pair of alternating voltage generating elements; each of said generating elements comprising a rotor and a stator having grating elements in the form of teeth formed thereon as a result of making cavities in the surface of the rotors and stators, the teeth being axially disposed and equidistant from one another; one of said stators being stationary, the other stator being adapted to move with said shaft, said pair of alternating voltages comprising one reference voltage produced by said stationary stator voltage generating transducer element and one variable phase voltage produced by said movable stator voltage generating transducer element; said rotors being rigidly connected and adapted to revolve at a constant rate under the influence of an electromagnetic field; an input circuit to each transducer voltage generating element comprising a direct current source and a tank circuit, the tank circuit being tuned to resonate at the frequency of said voltage from said transducer voltage generating element, the tank circuit being connected in electrical conductive relationship between said direct current source and said stator, said rotor being electrically grounded; first and second automatic frequency controlled oscillator circuits; the reference voltage being applied to the first oscillator circuit, the variable phase voltage being applied to the second oscillator circuit; a numerator gate pulse former into which the outputs of both oscillator circuits are fed; a denominator gate pulse former into which the output from the first oscillator circuit only is fed; first and second gating circuits, the output from said numerator gate pulse former being applied to the first gating circuit, the output from the denominator gate pulse former being applied to the second gating circuit; a high frequency pulse generator, the output of which is fed into the first and second gating circuits; and a numerator counter and a denominator counter, the output of the first gating circuit being fed into the numerator counter, the output of the second gating circuit being fed into the denominator counter.

4. A shaft angular position converter adapted to convert analog shaft position into digital values comprising an electromechanical transducer for generating a pair of alternating voltages the phase difference of which is adapted to vary; said transducer comprising a housing, a shaft whose position is to be measured rotatable in said housing, a stator surrounding said shaft and fixed against rotation in said housing, a second stator coaxial with said first stator carried by and rotatable with said shaft, a rotor in said housing having opposite end portions surrounding said first and second stators, said rotor end portions and stators having grating elements in the form of axially directed teeth equidistantly spaced about the circumference thereof, means to rotate said rotor, an electrical input circuit to each stator, said rotor being electrically grounded, said first stator and rotor generating a reference alternating voltage and said second stator and rotor generating a variable phase voltage; and electronic circuitry adapted to digitize said phase difference.

5. The invention in accordance with claim 4 in which the electrical input circuit to each stator includes a direct current source and a resistor connected to said stator.

6. The invention in accordance with claim 4 in which the electrical input circuit to each stator comprises a direct current source and a tank circuit, said tank circuit being tuned to resonate at the frequency of said voltage from said transducer, the tank circuit being connected between said direct current source and stator.

7. The invention in accordance with claim 3 wherein each automatic frequency controlled oscillator circuit comprises an oscillator and a phase invertor, the oscillator output being fed into the phase converter; a phase detector into which the positive voltage and the negative voltage from the phase invertor are fed, the voltage from the transducer being applied to said phase detector additionally; an automatic frequency control device into which the output from the phase invertor is fed, the output from the automatic frequency control device being fed into the oscillator.

References Cited in the file of this patent
UNITED STATES PATENTS

| | | |
|---|---|---|
| 2,611,964 | Buisson | Sept. 30, 1952 |
| 2,674,729 | Carter | Apr. 6, 1954 |
| 2,717,987 | Hagen | Sept. 13, 1955 |
| 2,734,188 | Jacobs | Feb. 7, 1956 |
| 2,769,969 | Comstock | Nov. 6, 1956 |
| 2,770,798 | Roth | Nov. 13, 1956 |
| 2,775,755 | Sink | Dec. 25, 1956 |